US006592918B2

United States Patent
Kaeser

(10) Patent No.: US 6,592,918 B2
(45) Date of Patent: Jul. 15, 2003

(54) ASSEMBLY WITH POUCH AND FITMENT AND PROCESS FOR ITS MANUFACTURE

(75) Inventor: Thomas Kaeser, Kestenholz (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/858,277

(22) Filed: May 16, 2001

(65) Prior Publication Data

US 2002/0005241 A1 Jan. 17, 2002

(30) Foreign Application Priority Data

May 23, 2000 (EP) .............................. 00110885

(51) Int. Cl.[7] .............................. A61J 9/00; B65D 85/00
(52) U.S. Cl. ........................ 426/115; 426/394; 383/202; 383/906
(58) Field of Search ................................ 426/115, 394, 426/117; 383/202, 203, 906, 80

(56) References Cited

U.S. PATENT DOCUMENTS

| 2,850,422 A | | 9/1958 | Welch, Jr. .................... 154/118 |
| 3,117,874 A | * | 1/1964 | Horan ......................... 426/117 |
| 3,231,444 A | | 1/1966 | Shick .......................... 156/282 |
| 4,063,990 A | | 12/1977 | Volz et al. .................. 156/580.2 |
| 4,512,136 A | | 4/1985 | Christine ...................... 53/410 |
| 4,632,673 A | | 12/1986 | Tiitola et al. ................. 604/415 |
| 4,640,425 A | * | 2/1987 | Cabernoch ............... 426/115 X |
| 4,718,215 A | | 1/1988 | Carveth et al. ................ 53/410 |
| 5,473,857 A | | 12/1995 | Keeler .......................... 53/410 |
| 5,514,123 A | * | 5/1996 | Adolf et al. ............ 383/906 X |

FOREIGN PATENT DOCUMENTS

| EP | 0 583 765 A1 | 2/1994 |
| GB | 853082 | 11/1960 |
| JP | 62-257830 | 11/1987 |
| JP | 63212531 | 9/1998 |
| WO | WO 96/19387 | 6/1996 |

OTHER PUBLICATIONS

WO 8504574 Cabernoch et al, Oct. 24, 1985.*

* cited by examiner

Primary Examiner—Reginald L. Alexander
(74) Attorney, Agent, or Firm—Winston & Strawn

(57) ABSTRACT

The present invention relates to an assembly including a pouch, a product filled in the pouch, and a fitment that is applied to the pouch through the method of ultrasonic sealing. The pouch may be produced without any fitment or opening device and completely sealed after the filling. The fitment may be applied through the method of ultrasonic sealing after the filling and sealing of the pouch. The pouch may include a film material specially treated on the inside surface through the addition of a special lacquer or film layer to avoid a sealing at this position. The fitment includes one or more of any thermoplastic polymer, or a special blended polymer, such as metallocene.

20 Claims, 2 Drawing Sheets

ASSEMBLY WITH POUCH AND FITMENT AND PROCESS FOR ITS MANUFACTURE

FIELD OF INVENTION

The present invention relates to an assembly including a pouch, a product to fill the pouch, and a fitment that is applied to the pouch through the method of ultrasonic sealing.

BACKGROUND OF THE INVENTION

It is known in the art to seal fitments on conventional pouches by heating or by ultrasonic sealing. The ultrasonic sealing technique involves the use of high frequency mechanical vibrations transmitted through thermoplastic parts to generate a frictional heat build-up at an interface. It is known to make ultrasonic seal fitments, but the sealing is carried out on an empty pouch; the pouch is formed, the fitment is sealed on the pouch, the product is filled, for example by aseptic filling, and the pouch is finally sealed to obtain the assembly to be stored. The problem with such a procedure is that the manufacture of the assembly takes too much time and the line of production is too complicated, because it includes one more step in the process and results in a more expensive process. Furthermore, there is a risk that the sealing of the fitment is not safe enough.

The aim of the present invention is to have an assembly including a pouch and a fitment, wherein the production time is shorter than in the prior art technique, the line of production is simpler, and the fitment is sealed for a safer storage, i.e., the risk of the seal being breached is minimized or entirely avoided.

SUMMARY OF THE INVENTION

The invention relates to an assembly including a pouch including a film material sufficiently treated on a portion of an inside surface to avoid a sealing on the inside surface, the pouch being produced without any fitment or opening device and being completely sealed after filling; a product filled in the pouch; and a fitment including a thermoplastic polymer or blend thereof and being applied to the pouch through the method of ultrasonic sealing after filling and sealing of the pouch.

In one embodiment, the pouch is treated with a lacquer or film layer. In another embodiment, the fitment further includes a plug or snap-on type closure and the product is withdrawn through the fitment with a spiking device. In another embodiment, the fitment futher includes a screw-off type closure and inside the fitment is a tamper-evident part that is pre-punctured and sealed together with the film material. In yet another embodiment, the film material has high barrier properties. In another embodiment, the film material includes one or more of a plastic film, a laminate film in the for of a semi-rigid pouch, or a soft pouch.

In another embodiment, the product includes one or more of a liquid and viscous food or pet food, clinical nutrition products, milk-based products, any kind of juice, fruit products, mineral water, still drinks, soups, sauces, dressings, or mayonnaise. In one embodiment, the product is filled under fresh, aseptic, UHT, pasteurized conditions, or in a sterilized packaged. In another embodiment, the fitment further includes a body and a base including a plurality of concentric grooves. In yet another embodiment, the pouch includes at least three layers having different thicknesses, materials, or both. In still another embodiment, the layers include one or more of polyethylene, polyamide, EVOH, or a combination thereof.

The invention also relates to a process for the manufacture of an assembly including: filling a pouch with a product, sealing the pouch, transporting the pouch on conveying means to an ultrasonic device, charging the device with a fitment, moving the device downwards onto the pouch, pressing the fitment against an anvil, transporting by the sealing device a set amount of energy into a base of the fitment, sealing the fitment on the pouch, moving the sealing device upwards, and freeing the pouch with the fitment.

In one embodiment, the sealing device creates energy directors to guide and focus the energy to specific areas of the pouch during the sealing process. In another embodiment, the sealing is carried out on a Branson device such that the energy set free for the sealing process can be controlled.

The invention further relates to a process for manufacturing an assembly including: filling a pouch with a product, sealing the pouch so as to contain the product, and sealing a fitment to the sealed, filled pouch. In one embodiment, the fitment is sealed by ultrasonic sealing. In another embodiment, the process further includes transporting the sealed pouch to a zone for sealing the fitment thereon.

BRIEF DESCRIPTION OF THE DRAWINGS

The invention will be better understood with reference to the following drawings, wherein.

DETAILED DESCRIPTION OF THE INVENTION

Figure 1:
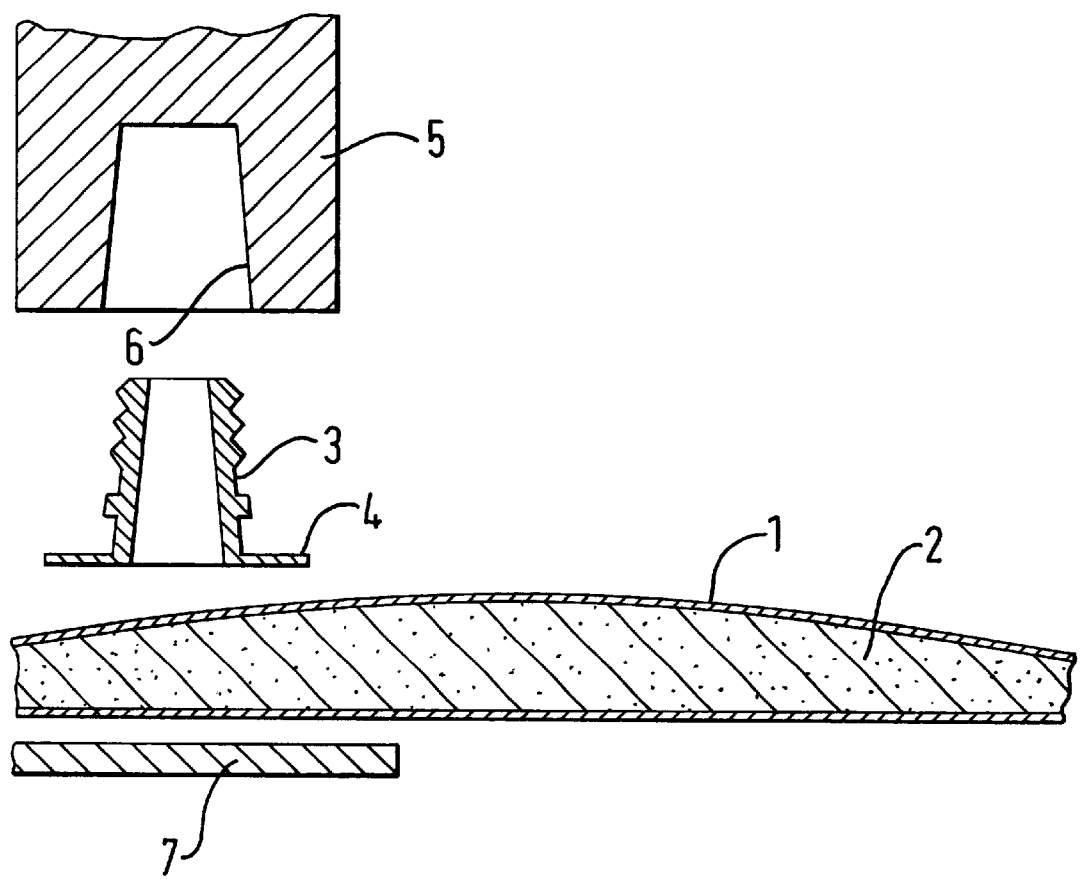
FIG. 1 is a schematic view before the sealing of the fitment.

The present invention concerns an assembly including a pouch, a product to fill the pouch, and a fitment that is applied to the pouch through the method of ultrasonic sealing. The pouch is produced without any fitment or opening device and completely sealed filling with a desired product. The fitment is applied through the method of ultrasonic sealing after the filling and sealing of the pouch. The pouch may include a film material specially treated on the inside surface through the addition of a special lacquer or film layer to avoid a sealing at this position, and the fitment may include any thermoplastic polymer or a specially blended polymer, such as, for example, metallocene-catalyzed polymer.

The pouch of the invention is filled with the product, the pouch is sealed, and then the fitment is ultrasonically sealed on the pouch. It is important that the film material of the pouch be treated on the inside surface to avoid the sealing of both layers of the pouch. This will be more clearly understood in relation to the drawings described below. The inside surface may have a special lacquer or a film layer.

The material of the pouch has low, medium, or high barrier properties as desired and depending upon the filler material. Preferably, the material of the pouch has high barrier properties. The term "high barrier properties" will be readily understood by one of ordinary skill in the art as having a water vapor transmission rate of less than 1 g/(m$^2$*24 h) at 23° C., 50% r.h. or an oxygen transmission rate of less than about 1 cm$^3$/(m$^2$*24 h*bar) at 38° C., 90% r.h. The term "medium barrier properties" means a water vapor transmission rate of 1 to 40 g/(m$^2$*24 h) or an oxygen transmission rate of 1 to 100 cm$^3$/(m$^2$*24 h*bar). "Low barrier properties" means a water vapor transmission rate of at least 40 g/(m$^2$*24 h) or an oxygen transmission rate of at least 100 cm$^3$/(m$^2$*24 h*bar).

The pouch-forming material may include one or more amorphous polymers, such as ABS, ABS/polycarbonate alloy, acrylic, acrylic multipolymer, butadiene/styrene, phenylene-oxide based resins, polyamide-imide, polyetherimide, polyethersulfone, polystyrene (general purpose), polystyrene (rubber modified), polysulfone, PVC; or one or more semi-crystalline polymers, such as acetal, cellulosics, fluoropolymers, polyester thermoplastic, ionomer, liquid crystal polymers, nylon, polyethylene terephtalate, polybutylene terephtalate, polyethylene, or polypropylene; or any combination thereof.

The pouch may include a plastic film, a laminate, or a co-extruded film. In preferred embodiments, the pouch can be semi-rigid or soft, i.e., deformable. The thermoplastic polymer used for the fitment must be compatible with the material of the pouch. The fitment can be of the same material as described above with respect to the pouch. The fitment includes a body and a base, wherein the base includes concentric grooves for improving the ultrasonic welding.

Products suitable for filling the pouch include, but are not limited to, liquid and viscous food or pet food, clinical nutrition products, milk-based products, any kind of juice, fruit products, mineral water, still drinks, soups, sauces, including dressings, and mayonnaise, or any combination thereof.

In one embodiment of the invention, the fitment includes a plug or snap-on type closure and the product is withdrawn through the fitment with a special means, for example a spiking device known in the art. In a second embodiment of the invention, the fitment includes a screw-off type closure and inside the fitment a tamper-evident part, that is pre-punctured and sealed together with the pouch material. The product in the pouch may be filled under fresh, aseptic, UHT, pasteurized conditions, or in sterile package.

The present invention farther relates to a process for the manufacture of the assembly described above, wherein the pouch is filled with the product and sealed, the pouch is then transported on conveying means to an ultrasonic sealing device, wherein the device is charged with a fitment and moved downwards onto the pouch pressing the fitment against an anvil. An amount of energy is set free and transported by the sealing device into the fitment base, wherein the sealing of the fitment on the pouch takes place, the sealing device is moved upwards, and frees the pouch.

The amount of energy of the sealing process depends on the type of fitment and the material of the pouch. The pouch material is preferably a composite film article having at least three layers of material. In one embodiment, the at least three layers are alternating materials, while in another embodiment, each of the at least three layers differs in thickness or materials, or both. The pouch preferably includes polyethylene, polyamide, or EVOH, or a combination thereof. In one preffered embodiment, the pouch is in a multilayer polyethylene/polyamide/EVOH/polyethylene form and the fitment includes polyethylene, such as high density polyethylene.

The sealing device is designed in a special way creating energy directors to specially guide and focus the energy to specific areas of the pouch during the sealing process. The sealing is carried out on a Branson device, where the energy that is released for the sealing process can be controlled and directed as desired.

Referring to FIG. 1, the pouch 1 is filled with a clinical nutrition product 2; the pouch 1 is sealed and ready for application of the fitment 3. The fitment 3 has a base 4. The ultrasonic sealing head 5 with its aperture 6 is just above the fitment and the pouch is placed just above an anvil 7.

Figure 2:
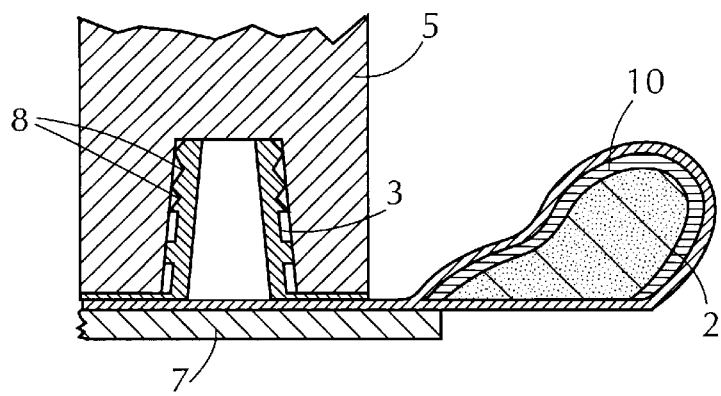
FIG. 2 is a schematic view during the sealing.

Referring to FIG. 2, the ultrasonic head 5 moves then, so that the fitment 3 enters the aperture 6 of the ultrasonic head 5 and the head 5 presses the pouch 1 against the anvil 7. The high frequency is then set up and the heating developed allows the base 4 of the fitment 3 to be sealed on the filled pouch 1. Because of the special lacquer or film layer 10 on the inside surface of the pouch 1, only the fitment 3 is sealed and not both layers of the pouch. The fitment can contain concentric grooves 8 to facilitate ultrasonic welding.

Figure 3:
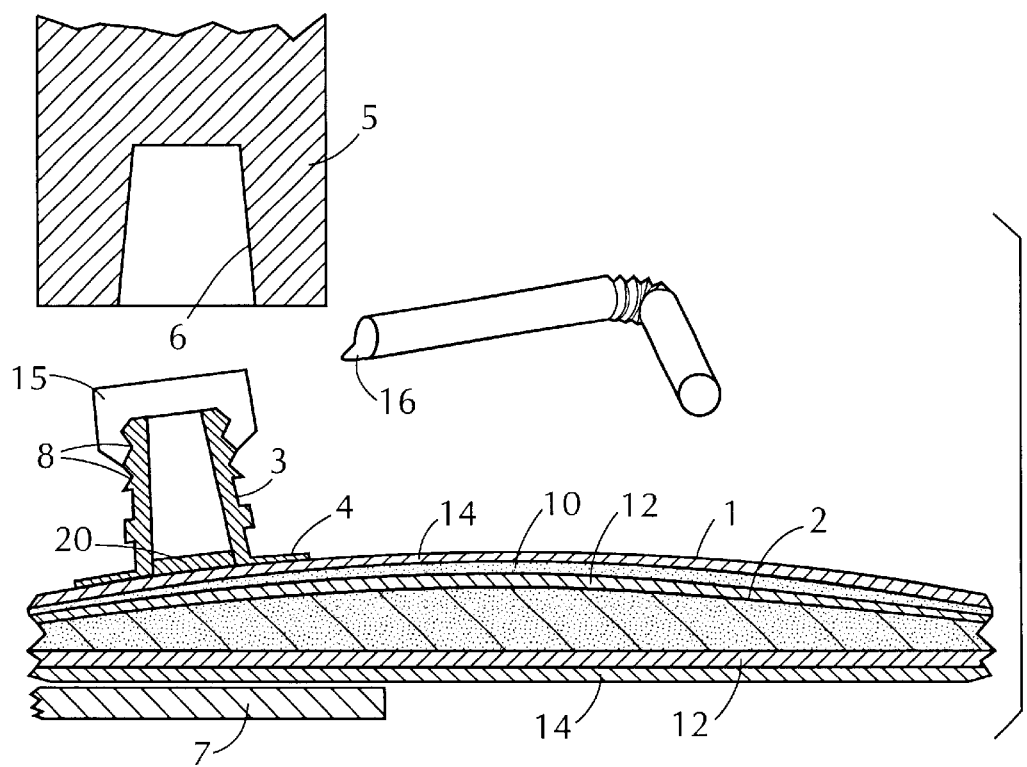
FIG. 3 is a schematic view after the sealing.

Referring to FIG. 3, the ultrasonic head 5 is finally moved, the fitment 3 remains sealed on the outside of the pouch 1 through its base 4, and the pouch 1 is then ready to be stored. The pouch can also contain at least three different layers, for example a film layer 10 between a portion of inner layer 12 and outer layer 14. A closure device such as a cap 15 and a spiking device 16 can be included with the fitment. Also, a tamper-evident part 20 could be added in the fitment when it is sealed to the pouch.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims. It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. An assembly comprising:
   a food product;
   a pouch comprising a film material sufficiently treated with a lacquer or a second film material on a port on of an inside surface of the pouch to avoid sealing opposing portions of the pouch to each other, the pouch being produced without any fitment or opening device, containing the food product therein and being completely sealed; and
   a fitment comp sing a thermoplastic polymer or blend thereof and being ultrasonically sealed to the pouch after filling and sealing of the food product therein.

2. The assembly of claim 1, wherein the fitment further comprises a closure and the product is withdrawn through the closure after being pierced by a spiking device.

3. The assembly of claim 1, wherein the fitment further comprises a closure and a tamper-evident part that is pre-punctured and sealed together with the first film material.

4. The assembly of claim 1, wherein the first film material has high barrier properties and comprises one or more of a plastic film, a laminate film in the form of a semi-rigid pouch, or a soft pouch.

5. The assembly of claim 1, wherein the food product comprises one or more of a liquid and viscous food or pet food, clinical nutrition products, milk-based products, any kind of juice, fruit products, mineral water, still drinks, soups, sauces, dressings, or mayonnaise.

6. The assembly of claim 1, wherein the product is fresh, is subjected to aseptic, UHT, or pasteurizing conditions, or is sterilized.

7. An assembly comprising:

a food product;

a pouch comp sing a film material sufficiently treated on a portion of an inside surface of the pouch to avoid sealing opposing portions of the pouch to each other, the pouch being produced without any fitment or opening device, containing the food product therein and being completely sealed; and a fitment com rising a thermoplastic polymer or blend thereof and being ultrasonically sealed to the pouch after filling and sealing of the food product therein, wherein the fitment further comprises a body and a base comprising a plurality of concentric grooves.

8. The assembly of claim 1, wherein the pouch comprises at least three layers having different thicknesses, materials, or both.

9. The assembly of claim 8, wherein the layers comprise one or more of polyethylene, polyamide, EVOH, or a combination thereof.

10. The assembly of claim 1, wherein the first film material has medium barrier properties.

11. The assembly of claim 1, wherein the fitment comprises at least one of polyethylene or a metallocene-catalyzed polymer.

12. The assembly of claim 1, wherein the pouch comprises one or more amorphous polymers, semi-crystalline polymers, or a combination thereof.

13. Th assembly of claim 12, wherein the amorphous polymer comprises one or more of ABS, ABS/polycarbonate alloy, acrylic, acrylic multipolymer, butadiene/styrene, phenylene-oxide based resins, polyamide-imide, polyetherimide, polyethersulfone, polystyrene rubber-modified-polystyrene, polysulfone, PVC, and the semi-crystalline polymer comprises one or more of acetal, cellulosic materials, fluoropolymers, polyester thermoplastic, ionomer, liquid crystal polymers, nylon, polyethylene terephtalate, polybutylene terephtalate, polyethylene, or polypropylene; or any combination thereof.

14. The assembly of claim 1, wherein the pouch comprises layers of polyethylene, polyamide, EVOH, and polyethylene in that order.

15. A process for manufacturing the assembly of claim 1 which comprises: filling the pouch with the product; sealing the pouch so as to contain the product; sealing the fitment to the sealed, filled pouch; and recovering the sealed pouch and fitment as an assembly.

16. The process of claim 15, further comprising transporting the sealed pouch to a zone for sealing the fitment thereon.

17. The process of claim 15, wherein sealing the fitment comprises ultrasonic sealing.

18. The process of claim 17 wherein the fitment sealing step is accomplished by transporting the pouch on conveying means to an ultrasonic sealing device;

charging the device with the fitment;

moving the device downwards onto the filled pouch;

pressing the fitment against an anvil;

transporting by the sealing device a set amount of energy into a base of the fitment;

sealing the fitment on the pouch;

moving the sealing device upwards; and freeing the pouch with the fitment to recover the assembly.

19. The process of claim 18, wherein the sealing device creates energy directors to guide and focus the energy to specific areas of the pouch during the sealing process.

20. The process of claim 18, wherein the sealing is carried out on a Branson device such that the energy set free for the sealing process can be controlled.

* * * * *

UNITED STATES PATENT AND TRADEMARK OFFICE
CERTIFICATE OF CORRECTION

PATENT NO.    : 6,592,918 B2
DATED         : July 15, 2003
INVENTOR(S)   : Kaeser It is certified that error appears in the above-identified patent and that said Letters Patent is hereby corrected as shown below:

<u>Column 4,</u>
Line 41, delete "port on" and insert -- portion --; and
Line 47, delete "comp sing" and insert -- comprising --.

<u>Column 5,</u>
Line 3, delete "comp sing" and insert -- comprising --;
Line 9, delete "com rising" and insert -- comprising --; and
Line 29, delete "Th" and insert -- The --.

Signed and Sealed this

Ninth Day of September, 2003

JAMES E. ROGAN
*Director of the United States Patent and Trademark Office*